United States Patent [19]

Nater

[11] 4,439,793
[45] Mar. 27, 1984

[54] THIN FILM HEAD ARRAY

[75] Inventor: Charles Nater, Saratoga, Calif.

[73] Assignee: Fuji Photo Film Co., Ltd., Kanagawa, Japan

[21] Appl. No.: 313,841

[22] Filed: Oct. 22, 1981

[51] Int. Cl.³ .......................... G11B 5/28; G11B 5/48
[52] U.S. Cl. .................................... 360/121; 360/125
[58] Field of Search ............... 360/125, 126, 119-123, 360/127, 102-103

[56] References Cited

U.S. PATENT DOCUMENTS

| 3,562,443 | 2/1971 | Bos et al. | 360/121 |
| 3,846,841 | 11/1974 | Lazzari et al. | 360/121 |
| 4,072,993 | 2/1978 | Nomura et al. | 360/121 |
| 4,219,853 | 8/1980 | Albert et al. | 360/121 |
| 4,225,892 | 9/1980 | Bassett et al. | 360/122 |
| 4,334,252 | 6/1982 | Toriu | 360/121 |

FOREIGN PATENT DOCUMENTS 2057177  3/1981  United Kingdom ................ 360/121

OTHER PUBLICATIONS

IBM Tech. Disc. Bull., B. W. Kington, Interleaved Multielement Magnetic Head, vol. 15, No. 6, Nov. 1972, p. 2035.
IBM Tech. Disc. Bull., D. H. McClung, Offset Cores for Reduced Gap-to-Gap Spacing, vol. 8, No. 7, Dec. 1965, p. 952.
Stenning, "Interleaved Multielement Magnetic Heads", IBM Tech. Disc. Bul., vol. 14, No. 7, 12/71, p. 2129, S2659065.
Huckabee, "Recording Apparatus", IBM Tech. Disc. Bul., vol. 9, No. 3, pp. 260-261, 8/66.

Primary Examiner—Stuart N. Hecker
Attorney, Agent, or Firm—Sughrue, Mion, Zinn, Macpeak & Seas

[57] ABSTRACT

A thin film head array has at least two stacks, each stack having a selected number of recording heads. The two stacks are joined such that the gaps in the heads of the first stack are interleaved with respect to the gaps in the heads of the second stack, and when such an array is used for recording and reproducing data on a magnetic medium, a plurality of recording tracks are provided. In a second embodiment, two assemblies, each having a plurality of stacks according to the first embodiment, are joined in a V-shape. Each gap in the heads of each stack occupies separate tracks on the recording medium and each recording gap has a magnetizing orientation that is 3°-15° with respect to that of the adjacent heads.

15 Claims, 6 Drawing Figures

THIN FILM HEAD ARRAY

BACKGROUND OF THE INVENTION

This invention relates to the field of magnetic recording. More particularly it relates to the recorder heads and the structural disposition thereof in a multitrack head.

In magnetic recording the use of thin film heads is well known. A thin film head generally designated by numeral 10 is shown in FIGS. 1 and 2 and comprises a bottom permalloy 20 formed on a substrate 30, with windings 40 provided on the permalloy. A top permalloy pole piece 50 is provided and is separated from the bottom permalloy layer by a selected gap 52. The windings 40 are connected to pads 42 wherein current driver 44 attaches. Insulation layers 60 are provided to insulate the windings 40 from adjacent permalloys 20 and 50. In operation, current from the current driver flows through the windings 40 to produce a magnetic field at the gap 52 that records magnetic spots on the magnetic tape or other recording medium 70.

The formation of the thin film head may be briefly described as follows: a silicon or ceramic substrate 30 is coated with a permalloy [NiFe] magnetic material 20. Then an insulating layer 60 of preferably silicon dioxide is formed on the permalloy. Next, aluminum or other conductor is deposited and patterned into windings 40 and this is followed by deposition of a second insulator 60. Optionally, a second patterned winding may be provided. For example, IBM produces a recording head using two layers of windings with four turns per layer, and "DASTEK" makes an improved recording head having five turns in one layer and four turns of the winding in another. After formation of the windings 40 the permalloy pole piece 50 is formed and situated connected at one of its ends 54 to the bottom permalloy 20 and separated from the bottom permalloy at its other end to provide the recording gap 52 as is well known in the art.

The largest use of such thin film recording head devices is for disk drives. Disk drives typically use a single head and move it across the disk. Some disk applications use a fixed head array. There are also some applications for the thin film heads in tape recorders but those that are used usually have two to four heads.

With the trend towards miniaturization, there is a need to record a lot of data in the smallest possible space on a recording medium such as magnetizeable tape. This is especially true where it is desired that the recording instrument use tapes of very narrow width, as for example with portable hand-held video cameras that utilize small cassettes with tape widths of less than a quarter of an inch wide.

It is possible to record a large amount of data on a tape of small width by running the tape at a very high speed but this would require an excessive length of tape. Additionally, at this high speed eddy currents and hysteresis losses begin to limit the usefulness of the recorded informtion and the usefulness of the head which must then be made of special material for use under such conditions. It is also possible to store a large amount of data by using fewer heads and moving the head along one track on the tape at a very fast speed, then stopping the tape and reversing the movement of the tape and positioning the head on a second track. That would require very fast movement and great precision in stopping and starting of the tape, inviting more problems with respect to ensuring the integrity of the recorded information.

Another option is to provide a plurality of heads across a tape, thereby increasing the number of tracks of data stored on the tape. However, although track separation need only be slightly larger than the gap length P, as shown in FIG. 3, in fact the track separation D is determined by the width of thin film head. As is apparent from FIG. 3 the pancake-like thin film head is much wider than the gap length P and consequently close packing of the tracks has not been obtainable heretofore. As a result the art has not been able to record a sufficient amount of video information on a tape which is relatively slow moving and narrow.

SUMMARY OF THE INVENTION

It is an object of the present invention to provide a thin film array which has none of the disadvantages of the prior art.

It is another object of the present invention to provide a thin film head array which allows greater packing density.

Still another object of the present invention is to provide a simple method of forming a thin film head array on a substrate and particularly a method of aligning plural stacks of thin film heads.

Another object of the present invention is to use integrated circuit technology to incorporate a field effect transistor or a preamplifier as part of the circuit for each head unit.

A further object of the present invention is to provide for positioning of the head array with respect to the tape in a manner that allows for greater noise immunity between adjacent heads and thus provide a better recording on the tape.

These and other objects are realized and the disadvantages of the prior art are overcome by providing a thin film head array comprising a plurality of stacks, each stack comprising a substrate having a desired number of heads formed thereon, and the recording gaps in the heads of adjacent stacks being placed in a staggered or interleaved relationship such that, for example, the recording gap in the first head in the second stack is offset from the recording gap in the first head in the adjacent stack.

In another embodiment of the present invention which may comprise, for example, four stacks as described above, a first assembly is comprised of two stacks positioned with the recording gaps placed in an interleaving relationship according to the first embodiment and a second assembly is similarly comprised of the other two stacks also positioned with their recording gaps being in an interleaving relationship. The two assemblies are positioned spaced apart substantially in the form of a V and this may be accomplished by placing a spacer in between the two assemblies. In this embodiment, the recording gaps occupy separate tracks and each track has a magnetization oriented at approximately 10° with respect to that of adjacent tracks. The tape is moved across this V-shaped array and information is recorded on the tape. This configuration of the recording gaps allows for greater noise immunity and less cross-talk between adjacent gaps.

BRIEF DESCRIPTION OF THE DRAWINGS

The invention may best be understood with reference to the detailed description of the preferred embodiment, taken in conjunction with the appended drawings in which.

DETAILED DESCRIPTION OF THE PREFERRED EMBODIMENT

Preliminarily it should be noted that the term "recording" gaps or heads has been used herein to generally indicate heads used in recording and playback devices. It should be understood that such a term is not a limitation but is to be construed broadly to include heads used for recording or playback or for erasing purposes.

Figure 4:
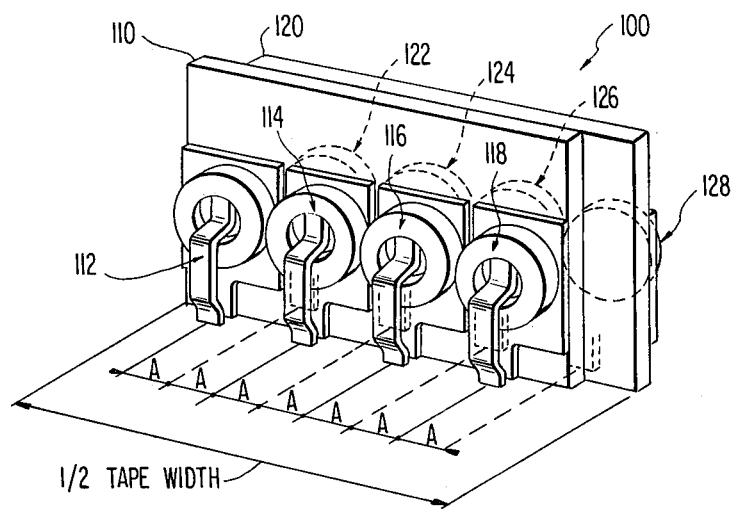
FIG. 4 is a perspective view of a thin film head array formed of two stacks according to the present invention

Referring now to FIG. 4, which illustrates a first embodiment of this invention, reference numeral 100 generally indicates a thin film head array comprising two stacks 110 and 120. The first stack 110 comprises four thin film heads 112, 114, 116 and 118 and they may be formed on a single substrate in the manner described earlier in the discussion of the background of the invention. The second substrate 120 comprises four heads 122, 124, 126, and 128. The two stacks are arranged with the second stack shifted a selected amount such that each recording gap in the second stack is placed substantially midway between the heads (and therefore the recording gaps) on the front stack 110. The two stacks are attached by adhesive such as epoxy. Of course it should be understood that the distance "A" noted in FIG. 4 may be varied when there are more than two stacks comprising an array.

With the thin film head array thus formed, it is positioned in an operative relationship to a recording medium, for example a magnetic tape, such that each recording gap in the array occupies a separate track on the magnetic tape. With two stacks positioned as in FIG. 4 the number of tracks available is twice that obtained from a single substrate. Thus, it is possible to pack greater amounts of data in a given region of the tape.

In forming the array of FIG. 4, the stacks can be joined back-to-back, or front-to-front, or front-to-back. For such purposes, where necessary, an insulation layer may be provided between adjacent stacks (for example, in a front-to-front position). When the array comprises four stacks, two may be joined back-to-back and the other two in a front-to-front or front-to-back relationship. The particular manner of joining the stacks will depend on the design for use, and may be dictated by manufacturing considerations.

As stated earlier, the thin film heads are formed on a substrate. Here substrates such as ferrite and silicon-on-sapphire (SOS) may be used. For purposes of aligning different stacks in the manner mentioned above, it would be helpful if the substrates are optically transparent. This would help in proper alignment of the two stacks. One such substrate that can be used is sapphire.

As an example of the packing density which can be achieved by the embodiment of FIG. 4, sixteen separate tracks can be recorded on a tape of 0.5 inches using a two stack array consisting of four heads of state of the art size in each stack. The eight heads record eight tracks on 0.25 inches of the tape width. Thus when the tape is used in two directions, by flipping the tape over, as is conventional, sixteen tracks can be recorded.

When the number of stacks in an array are increased, the distance between recording gaps decreases and therefore the packing density increases. However if the tracks are too close, a problem of "cross-talk" can arise between adjacent tracks during read-out of the recorded information. For example, the recording gap that may be reading data in track 3 might be influenced by the magnetically recorded data in tracks 2 and 4. This problem, which might occur with the high packing density of the present invention, can be overcome by a second embodiment of the present invention wherein the head stacks are angled relative to one another to insure that the data recorded in adjacent tracks are cross polarized relative to one another.

Figure 1:
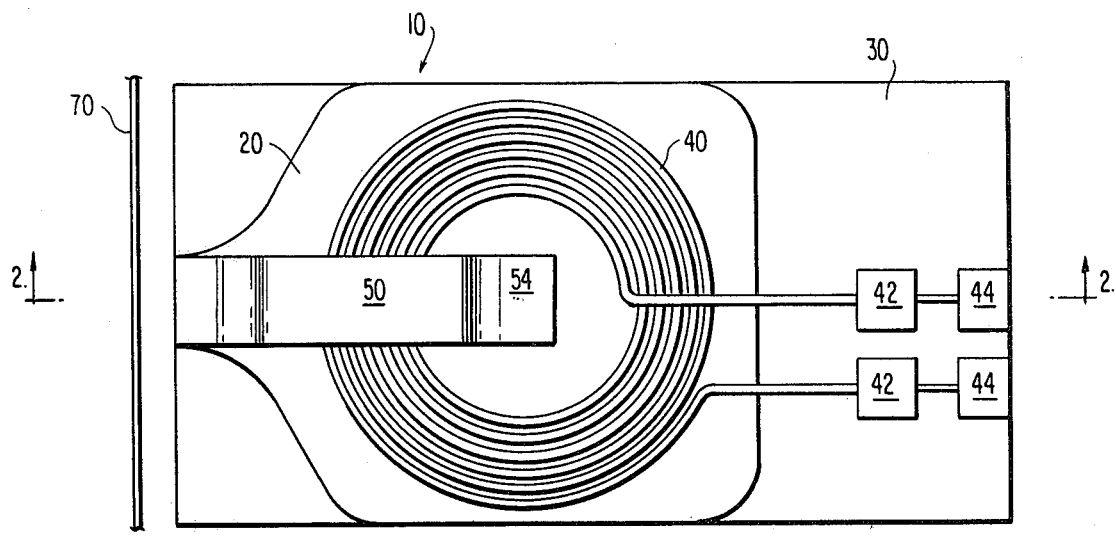
FIG. 1 is a top view of a thin film head
Figure 2:
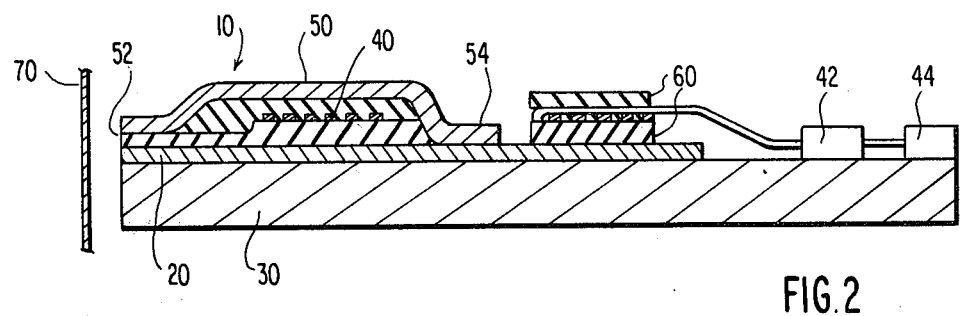
FIG. 2 is a sectional view of a thin film head of FIG. 1.
Figure 3:
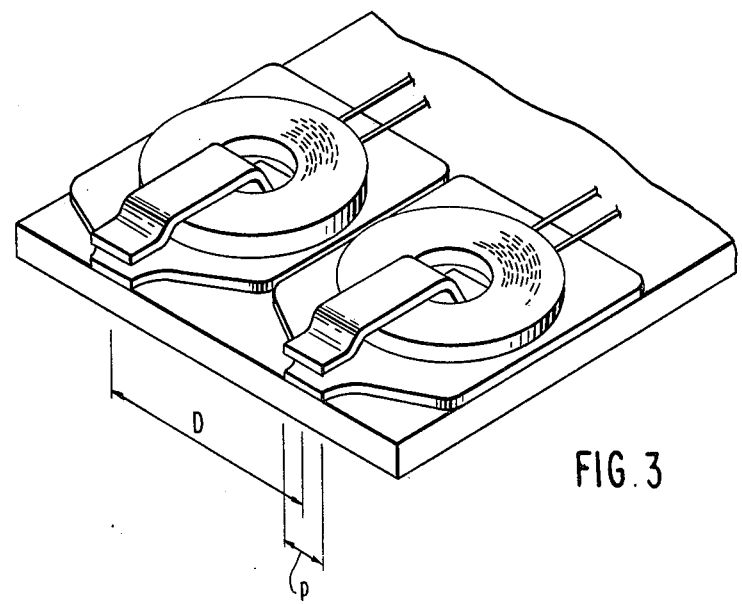
FIG. 3 is a view of two recording heads showing track distance and pole length.
Figure 5:
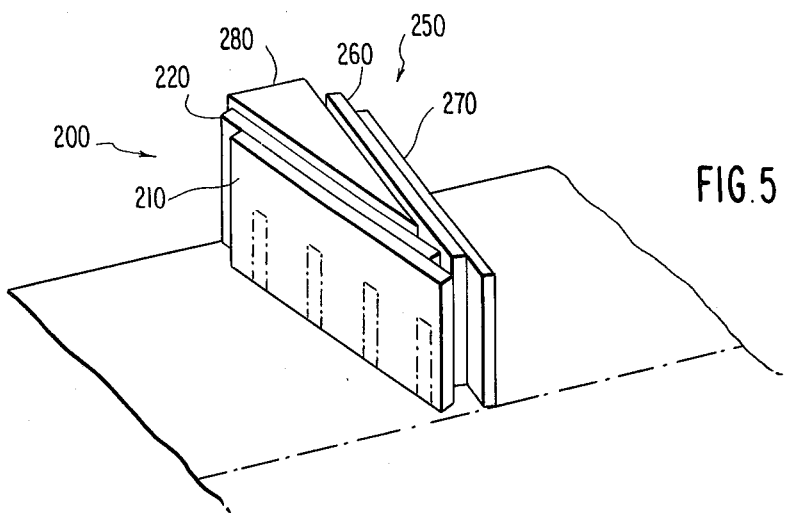
FIG. 5 is a perspective view of a second embodiment of the present invention

Referring to FIG. 5, therein the thin film head array according to the second embodiment comprises assemblies 200 and 250. The assembly 200 is formed by two stacks, 210 and 220, although it will be apparent from the discussion herein that each assembly may be formed of one or more stacks, two stacks per assembly being shown for illustrative purposes only. Each stack is assumed in this example to have four thin film formed thereon, although it should be understood that that is not a limitation on this invention. The stacks 210 and 220 of assembly 200 are formed in the same manner as illustrated in FIGS. 1 and 2. Similarly, assembly 250 is formed of stacks 260 and 270 and these may be formed in the same manner as illustrated in the embodiment of FIGS. 1 and 2. The assemblies 200 and 250 are positioned spaced-apart at an acute angle to form a "V". The acute angle may be between 3° and 15°, however the representation shown in FIG. 5 is greatly exaggerated for purposes of illustration. The "V" configuration may be achieved by providing a spacer 280 in the form of a wedge positioned between assemblies 200 and 250. Preferably the assemblies are positioned to form the sides of an isosceles triangle and situated to be symmetrical with respect to a line perpendicular to the direction of the tape. It should be mentioned that if the assemblies are positioned separated by an angle of less than 3°, they may effectively be in line; and with an angle greater than 15°, there arises a point of diminishing return when the adjacent gaps are skewed rather than parallel. The purpose of this embodiment will be made clear on further discussion hereinbelow.

Figure 6:
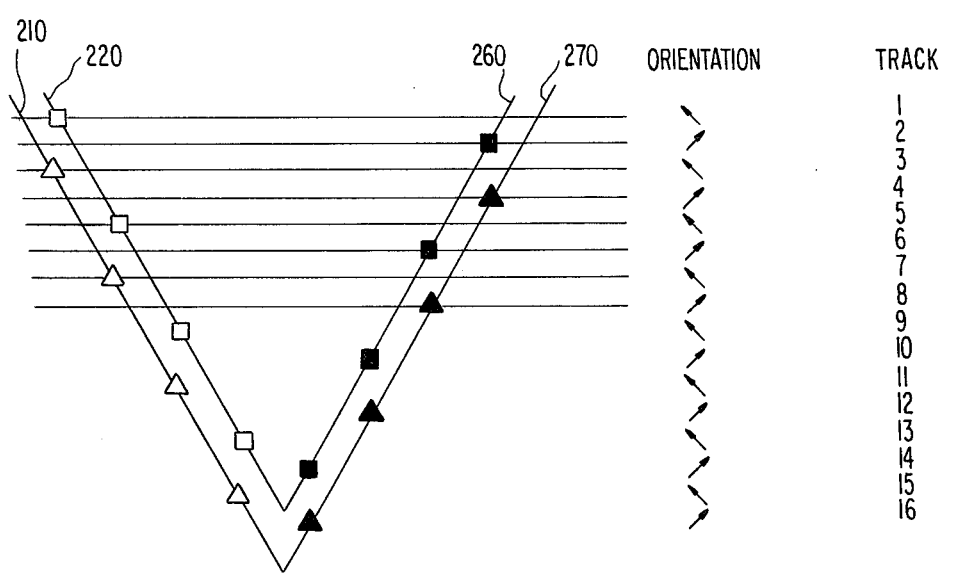
FIG. 6 is a diagram showing track arrangement according to the embodiment of FIG. 5.

The recording head array of FIG. 6 is positioned adjacent a magnetizeable recording medium, such as a magnetic tape. When means to generate a magnetic field in selected ones of the recording heads is activated, the region on the recording medium adjacent said head is magnetized. It can be seen that with the array of FIG. 6, the assembly is positioned such that the tracks of each recording gap on a magnetizeable medium are separate and independent.

It is well known that in the process of recording, the magnetizeable particles contained in said magnetizeable medium are magnetized having a particular orientation with respect to the poles and the gap of the recording head. If the assemblies 200 and 250 are aligned at an acture angle between 3° and 15° with respect to each other the orientation of the magnetized particles caused by the recording gaps in assembly 200 will differ from the orientation of the magnetized particles resulting from the recording gaps in assembly 250.

With the configuration of the assemblies as in FIG. 5, we can refer to FIG. 6 and state that track 1 on the magnetizeable medium is occupied by the first recording gap in stack 220, track 2 by the first recording gap in stack 260, track 3 by the first recording gap in stack 210, and track 4 by the first recording gap in stack 270, and track 5 by the second recording gap in stack 220 and so on. It will be readily seen that with the V-shaped configuration of the head array as shown in FIG. 6, and the assemblies arranged at an acute angle with respect to each other, the magnetizeable particles in track 1 will be oriented differently with respect to the orientation of the magnetizeable particles in track 2. Thus during the playback mode there is less chance of cross-talk arising from adjacent tracks.

In the process of manufacturing the thin film head array of the present invention, it is possible to form, for example, 24 heads on a single substrate, then to cut the substrate into four stacks with each stack containing six heads. Then the thin film head array of the present invention may be formed by arranging the stacks to stagger or interleave the recording gaps in the manner according to FIGS. 4 or 5. Two adjacent stacks are glued together by suitable material such as epoxy. It is possible also to make the thin film head array in multilayers. Here on one substrate the desired number of recording heads, for example 6, are formed. This would constitute the first stack. Then on top of this stack, a second substrate is positioned and the second stack is formed, with the heads and the recording gaps in each stack being appropriately interleaved. The process would be repeated if additional stacks are to be formed on top of the second stack.

It is well known in the art to form amplifiers and field effect transistors on chips or thin films. Accordingly, it is contemplated and oftentimes it will be desirable to form the thin film head array of the present invention such that the corresponding field effect transistor and the preamplifier or the amplifier circuit is formed together with the recording head of the present invention.

While the present invention has been described with particularity in conjunction with the attached drawings, it should be clear that it is not to be limited to the specific embodiment shown in the drawings but is to be limited only by the claims and the full range of equivalency that they are entitled to.

What is claimed is:

1. A magnetic recording and reproducing thin film head array, comprising:
   a plurality of recording and reproducing thin film heads, said heads being arranged into first and second assemblies with each assembly including at least one stack with each stack including a plurality of said heads arranged in a close packed manner;
   each stack of said first assembly having its heads aligned so as to be parallel to a first straight line, each stack of said second assembly having its heads aligned so as to be parallel to a second straight line, said first and second straight lines intersecting to form an angle between 3° and 15°;
   each stack of said first assembly being positioned relative to each stack of said second assembly such that gaps of heads of said first assembly interleaf with respect to gaps of heads of said second assembly relative to a widthwise direction of a recording medium to form a plurality of adjacent tracks in said recording medium.

2. The thin film head array of claim 1, wherein each assembly includes a plurality of stacks, each of said stacks including a plurality of said heads, gaps of heads of any one stack of said first assembly being interleaved with gaps of heads of all other stacks of said first assembly, gaps of heads of any one stack of said second assembly being interleaved with gaps of heads of all other stacks of said second assembly.

3. The thin film head array of claim 2, wherein said stacks of said first assembly are all parallel to said first straight line, said stacks of said second assembly all being parallel to said second straight line.

4. The thin film head array of claim 2 wherein each stack comprises six recording heads.

5. The thin film head of claim 2 wherein each stack has a front and a back surface, adjacent stacks in each of said first and second assemblies being positioned in one of a front-to-front, a front-to-back and a back-to-back relationship.

6. The thin film head of claim 2 further comprising amplifier means formed on said thin film corresponding to each of said heads.

7. The thin film head array as claimed in claim 2 wherein first and second stacks of said first assembly are formed on opposite sides, respectively, of a first substrate, and first and second stacks of said second assembly are formed on opposite sides, respectively of a second substrate.

8. The thin film head array of claim 1 wherein each of said stacks is formed on a sapphire substrate.

9. The thin film head of claim 1 wherein each of said stacks is formed on a ferrite substrate.

10. The thin film head of claim 1 wherein each of said stacks is formed on a silicon-on-sapphire substrate.

11. The thin film head of claim 1 wherein each of said stacks is formed on an optically transparent substrate.

12. The thin film head array as claimed in claim 1 wherein each of said stacks is formed on a substrate of magnetic material.

13. The thin film head array of claim 1, wherein said first and second assemblies are symmetrically arranged about a line which extends along said widthwise direction of said recording medium.

14. The thin film head array of claim 1, wherein said thin film heads comprise magnetic thin film heads, said heads being formed on optically transparent sapphire substrates.

15. The thin film head array of claim 1, further comprising a V-shaped wedge positioned between said first and second assemblies.

* * * * *